United States Patent [19]

Villar

[11] 4,444,990

[45] Apr. 24, 1984

[54] HEAT SENSING DEVICE

[75] Inventor: Luis F. Villar, Westbury, N.Y.

[73] Assignee: Servo Corporation of America, Hicksville, N.Y.

[21] Appl. No.: 416,055

[22] Filed: Sep. 8, 1982

[51] Int. Cl.³ .............................................. H01L 35/28
[52] U.S. Cl. .................................... 136/221; 136/230; 374/179; 374/208
[58] Field of Search ................... 29/573; 136/221, 230; 374/179, 208, 209

[56] References Cited

U.S. PATENT DOCUMENTS

| 2,988,582 | 6/1961 | McGregor et al. | 136/221 |
| 3,681,990 | 8/1972 | Barrett et al. | 374/154 |
| 4,118,986 | 10/1978 | Werner et al. | 374/153 |
| 4,259,123 | 3/1981 | Tymkewicz | 136/221 |

Primary Examiner—Leland A. Sebastian
Attorney, Agent, or Firm—Kane, Dalsimer, Kane, Sullivan and Kurucz

[57] ABSTRACT

An improved heat sensing tip for a temperature sensing device is provided. The tip comprises an elongated shell of heat conductive material. A temperature probe is positioned for movement within the shell toward and away from an opening in the shell. A cap of heat conductive material is positioned at the front of the probe. A spring urges the cap in contact with the shell for heat conductivity between the two when the device is not in operation. When the device is in operation, the spring bias is overcome thereby providing an insulating air gap between the shell and the tip.

5 Claims, 3 Drawing Figures

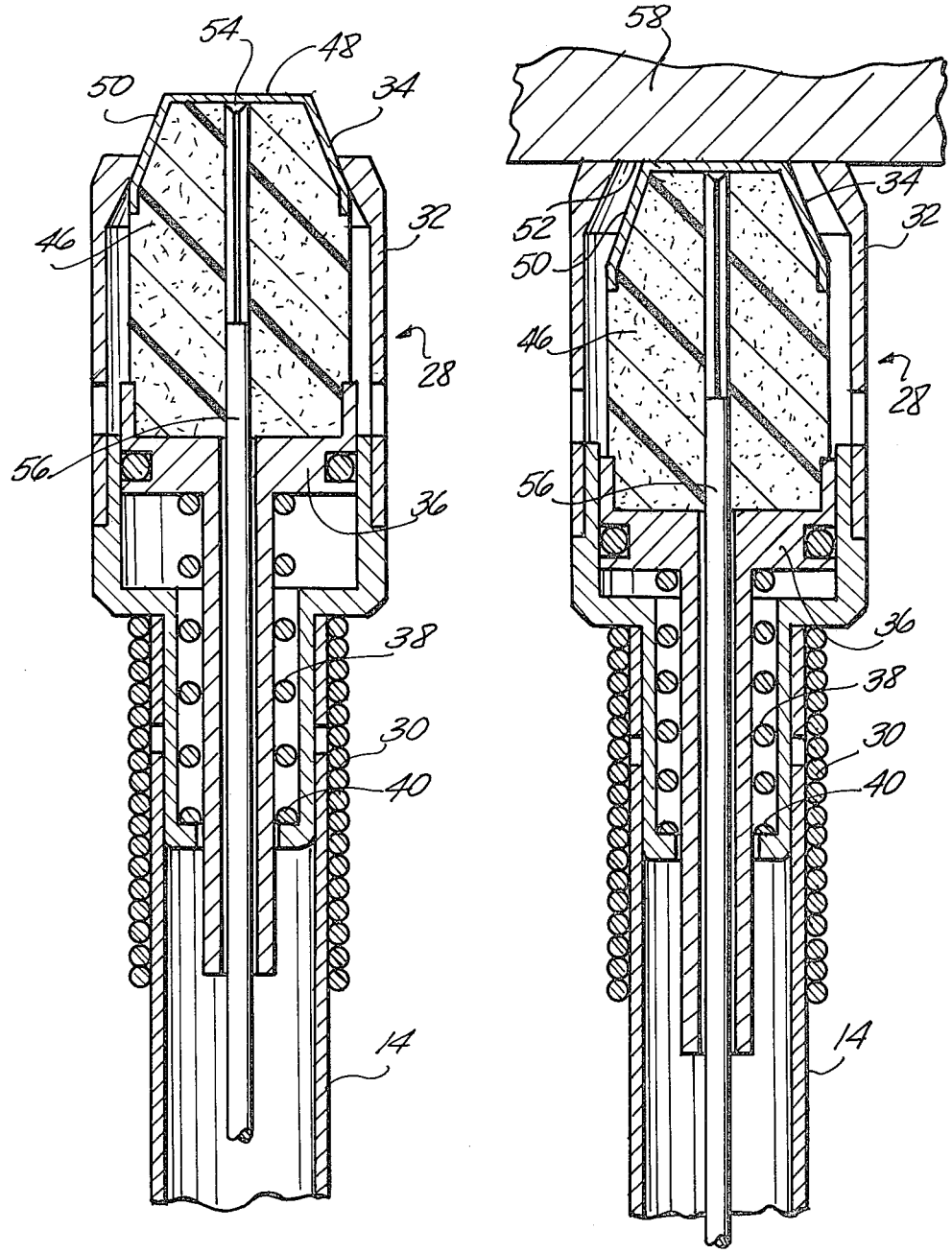

HEAT SENSING DEVICE

BACKGROUND OF THE INVENTION

The present invention relates to temperature sensing devices and in particular to an improved heat sensing tip for such devices.

Electronic thermometers are widely used in industrial applications as temperature sensing means. Such thermometers utilize a thermocouple or the like to convert a sensed temperature, under or above ambient, into an electrical signal which may be read out on a meter or digital display. Since the differential between the sensed temperature and ambient is detected, it is important that the heat sensing tip be brought to ambient before a temperature reading is taken. Similarly, it is desirable to shield the sensing tip from ambient when the temperature reading is being taken in order to obtain a true reading. This poses a problem where a series of temperature readings are to be taken in relatively quick succession as, for example, when a train crew member walks along the cars of a train measuring the temperature of each wheel or bearing to check for an overheated condition.

In view of the above, it is a principal object of the present invention to provide an improved temperature sensing device wherein the heat sensing tip is rapidly brought to the measuring temperature for each reading but insulated from ambient during the reading and rapidly brought back to ambient after each reading.

A further object is to provide such a device which is relatively simple and economical to construct.

A still further object is to provide such a device which utilizes conventional technology for heat sensing and temperature read out.

Still another object is to provide such a device which may be compact and easy to carry and operate.

Still other objects will be apparent from the following description of the invention.

SUMMARY OF THE INVENTION

The above and other beneficial objects and advantages are attained in accordance with the present invention by providing an improved temperature sensing device comprising a housing and a heat probe. The housing is formed of a heat conductive material and is in the form of an elongated shell having an opening at one end. The heat probe is positioned for movement within the shell and through the opening. The probe comprises an elongated block of insulating material having a cap of conductive material at one end. A thermocouple or the like is secured to the cap. The cap is dimensioned to pass through the shell opening to engage the object to be heat measured. A tapered rim extends from the cap and a portion of the rim is sufficiently large to engage the surfaces of the shell defining the opening. A spring normally biases the rim against the opening to bring the cap in heat conducting relationship with the housing. However, when the spring bias is overcome, the cap is insulated from the housing and allows the cap and hence the thermocouple to respond rapidly to the temperature of the object being heat measured.

BRIEF DESCRIPTION OF THE DRAWINGS

In the accompanying drawings:

FIG. 2 is an enlarged fragmentary elevational sectional view of the sensing tip portion of the device of FIG. 1 depicted in its normal position; and, FIG. 3 is a view similar to FIG. 2 depicting the tip in position for taking a heat measurement.

DETAILED DESCRIPTION OF THE PREFERRED EMBODIMENT

Figure 1:
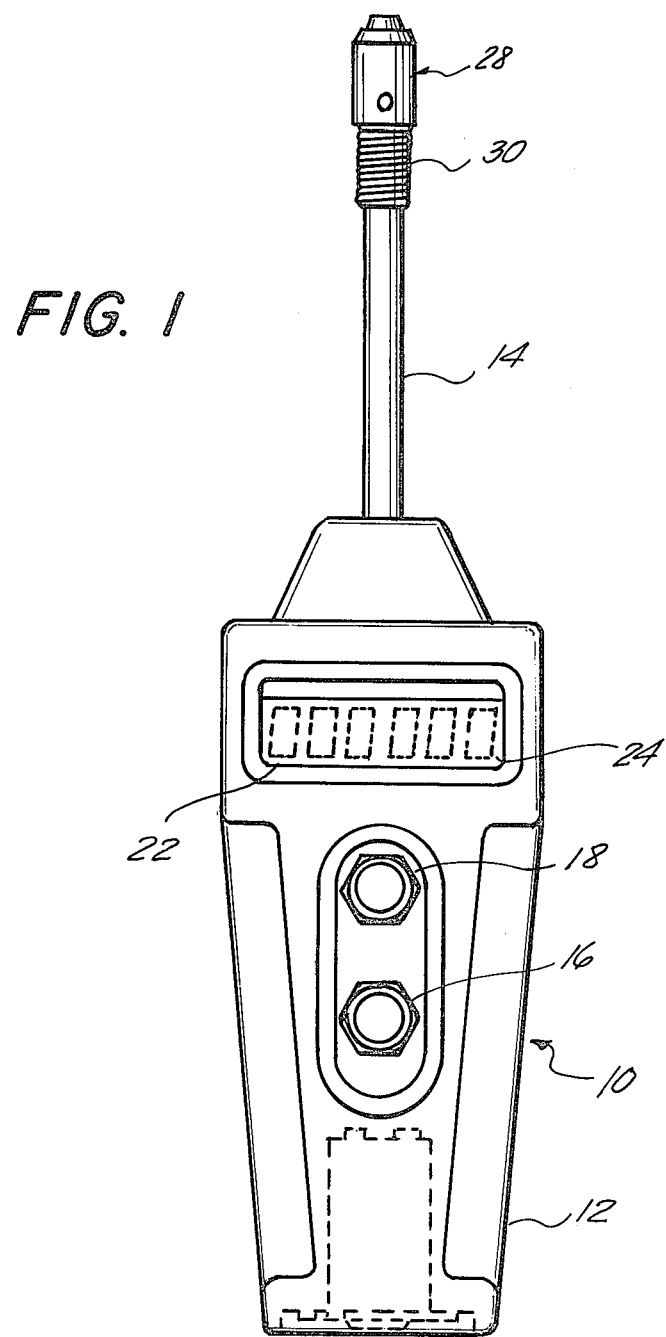
FIG. 1 is a front elevational view of a temperature sensing device in accordance with the present invention.

Reference is now made to the drawings and to FIG. 1 in particular wherein a temperature sensing device 10 in accordance with the present invention is depicted. The sensing device 10 comprises a case 12 from which a stem 14 extends. The stem 14 is preferably pivoted to the case so that it may be folded out of the way when the unit is not in use. An on-off switch may be provided at the pivot joint.

Contained within case 12 are the electronics for the device, the control switches 16, 18, a battery 20 and two three-digit readouts 22, 24. Display 24 is connected through switch 18 to a counter which permits the operator to keep count of the number of objects being measured. This is particularly useful where the device is used to check for an overheated railway car wheel or bearing. Display 22 is connected through switch 16 to the electronics for the thermocouple readout. The electronic circuits utilized in both the counting circuit and temperature readout circuit are conventional and form no part of the present invention.

The heat sensing tip 28 of the present invention is secured to the free end of stem 14 by a coupling spring 30. This permits the tip 28 to flex as required to permit it to align with an object to be measured.

The heat sensing tip 28 comprises a housing 32 in the form of an elongated shell. The housing 32 is formed of a material of relatively high heat conductivity such as copper or aluminum. An opening 34 is provided at the forward end of the shell. A plunger 36 is positioned within the housing internal cavity. The plunger 36 is normally urged forward (i.e., toward the shell opening) by a spring 38 which engages the underside of the plunger. The rear of spring 38 rests on an inwardly turned flange 40 of the rear portion of housing 32 which fits into the interior of the forward end of stem 14. An O-ring 42 seals the plunger 36 to the interior of the housing 32 while permitting a sliding motion.

A heat probe 44 sits on the forward side of plunger 36 for movement with the plunger. The heat probe 44 comprises a block 46 of insulating material such as Foamsil-28 insulation. Block 46 is dimensioned to remain spaced apart from the interior walls of the housing as shown. A cap 48 sits on the forward end of block 46. The cap 48 is formed of a heat conductive material and is dimensioned to pass freely through the opening 34 in shell 32. A tapered rim 50 extends rearwardly from cap 48. As will be noted, the dimensioning of the opening 34 and rim 50 are such that when plunger 36 is in its forwardmost position the rim 50 contacts the surfaces of housing 32 defining opening 34 thereby defining a heat conductive path between the two. When plunger 36 is retracted, however, (as shown in FIG. 3) an air gap 52 is presented between cap 48 and the shell thereby insulating the cap from the shell. A thermocouple 54 is spot welded to the rearward side of cap 48 and the electrical leads 56 from the thermocouple are drawn into the casing 12 through stem 14.

When the unit is in its relaxed state, as shown in FIG. 2, spring 38 urges plunger 36 into its forward most position thereby bringing cap 48 (and hence thermocouple 54) into a heat conduction relationship with shell 32. This speeds the heating or cooling of the unit to ambient. When the unit is to be used, it is pressed against the hot object 58 the temperature of which is desired. The bias of spring 38 is overcome causing the plunger and hence cap 48 to withdraw rearwardly. The spring 38, by urging the plunger forward ensures a good contact between the tip and the object to be measured. Air gap 52 is thus provided between cap 48 and shell 32 thereby insulating the cap (and hence thermocouple 54) from the shell. When the temperature reading is completed and the unit removed from object 58, spring 38 moves plunger 36 forward once again to bring cap 48 into contact with shell 32 and hence speed up the cooling (or heating) of the thermocouple to ambient for the next reading.

Thus, in accordance with the above, the aforementioned objects are effectively attained.

I claim:

1. A temperature sensing device comprising:
   a housing formed of a heat conductive material; a cavity within said housing; an opening in said housing communicating with said cavity; a heat probe positioned for movement within said cavity and through said opening from (1) a first position wherein portions of said probe contact said heat conductive surface so as to establish a heat conductive path between said probe and said housing to (2) a second position wherein said probe is insulated from said housing and positioned to take a temperature reading.

2. The invention in accordance with claim 1 further comprising spring means biasing said probe toward said first position.

3. The invention in accordance with claims 1 or 2 wherein said probe comprises a block of insulating material; a cap of heat conductive material positioned at an end of said black, said cap being dimensioned to pass through said opening; and a tapered rim of conductive material extending from said cap; a portion of said rim being dimensioned to engage said opening whereby to bring said probe into heat conductive contact with said housing.

4. The invention in accordance with claim 3 further comprising a thermocouple secured to said cap and electrical connections extending through said block to said thermocouple.

5. The invention in accordance with claims 1, 2, 3 or 4 further comprising a case; an elongated stem extending from said case, said housing being positioned at the free end of said stem; and spring means flexibly coupling said housing to said stem free end.

* * * * *